June 28, 1960 R. B. H. ROCKWELL 2,943,155
PREFERRED SUBSCRIBER TELEPHONE SYSTEM
Filed March 30, 1956
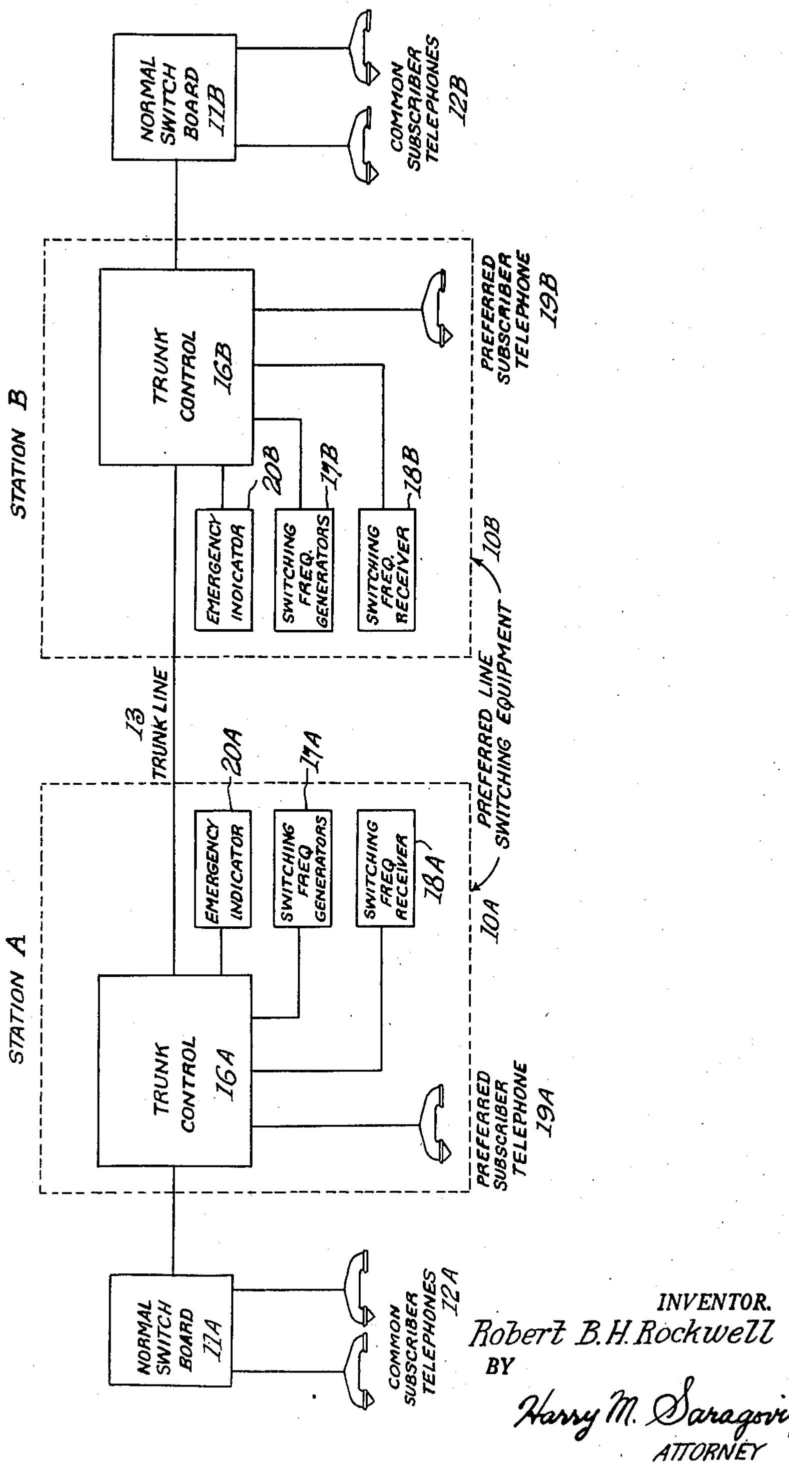
INVENTOR.
Robert B. H. Rockwell
BY
Harry M. Saragovitz
ATTORNEY 2,943,155

PREFERRED SUBSCRIBER TELEPHONE SYSTEM

Robert B. H. Rockwell, 1007 Poplar Drive, Falls Church, Va.

Filed Mar. 30, 1956, Ser. No. 575,289

1 Claim. (Cl. 179—27)

(Granted under Title 35, U.S. Code (1952), sec. 266)

The invention described herein may be manufactured and used by or for the Government for governmental purposes, without the payment of any royalty thereon.

This invention relates to preferred subscriber right-of-way telephone systems. More particularly this invention relates to switching apparatus for telephone systems which permits seizure of a busy line.

The object of the invention is to provide means to establish emergency connections to certain preferred lines in a group served by machine switching lines regardless of the busy condition of the lines themselves or the busy condition of the trunks leading to such group of lines.

For certain emergency conditions or for military operations it is necessary that connections be established to certain given lines without delay. Where such lines are in what is known as a community dial exchange they may be busy or all trunks to such area may be busy and it is the object of this invention to provide access to such lines irrespective of such busy conditions.

In military operations, particularly within an Air Force system and within a tactical Air Force, many telephone channels must be provided directly from subscriber to subscriber since delays in operating switchboards cannot be tolerated. Such channels are required for scrambling air craft and reporting radar information and other urgent operational traffic. In many cases, these so called preferred line channels are used for only a limited duration of the 24 hour period each day, resulting in poor economy in the utilization of a direct wire system. Also during warfare often all available telephone channels are taxed to capacity and the allocation of channels for operational use only further reduces the telephone handling capacity of the system. This invention makes the above mentioned special operational channels available for other normal headquarters use or local traffic use without jeopardizing operational requirements.

In general, when preferred line outgoing service is required, a subscriber at a preferred station performs an additional operation which transfers his line to the special service equipment. This action applies a switching pulse to the line which selects a particular trunk and dismisses all other connections thereto so as to provide immediate service to this preferred subscriber's line.

In accordance with the preferred embodiment of the invention the preferred subscriber's station is provided with an emergency switch, generally in the form of a push-button, which upon operation regardless of the busy or idle condition of the station will immediately transfer the line to the special equipment. The normal connection between the line and the regular switching facility is broken and a clear path to the distant point is established.

A feature of the invention is to permit the preferred subscriber to seize a trunk, dismiss all other connections thereto to provide a clear communication channel to the distant point.

The above mentioned objects and features together with other features not specially mentioned will be apparent from the following general and detailed description of the drawings which form a part of this specification.

The invention both as to its organization and method of operation together with further objects and advantages thereof will best be understood with reference to the following specification taken in connection with the accompanying drawing in which:

The figure shows a schematic diagram of the privileged subscriber switching system incorporated in a trunk line and embodying the present invention illustrating the general arrangement of the apparatus incorporated in the offices and the exchanges thereof.

This invention provides emergency or right of way service from the preferred subscriber to a distant station. By depressing a key at the preferred station, a switching frequency pulse in the audio range is transmitted over the trunk line causing the line to be switched to the far end subscriber. During the switching operation busy signals are applied to the interrupted lines and line seizure is further visually indicated by lamps or busy indicators.

Referring to the figure, block 10A represents the preferred subscriber switching equipment located at station A and block 10B is similar equipment located at station B. Block 11A refers to the normal community dial exchange switchboard system as usually employed in connection with the common subscriber telephone as shown at 12A. The term "common subscriber" refers to all subscribers except the privilege right-of-way subscribers. Switchboard 11A is connected through preferred subscriber equipment 10A to trunk line 13. The other end of the trunk is connected to the preferred subscriber switching equipment 10B through the normal switchboard 11B then to common subscriber telephone 12B.

The preferred subscriber switching equipment is generally connected in series between the trunk line and the community exchange. The point of connection might differ according to the type of trunk line and trunk exchange utilized. The equipment can be used in exchanges with a two wire incoming trunk line, two wire connection from transmitter to receiver, and two wire through connection of trunk lines for through traffic. Preferred subscriber switch equipment included within the dashed line of 10B consists of trunk control apparatus 16, switching frequency generators 17, switching frequency receiver 18 and emergency indicator 20. Preferred subscriber telephone 19A is connected to trunk control 16A in such a manner that upon lifting the handset from its cradle and depressing the proper key, generator 17A applies a switching pulse to trunk line 13. The pulse might be either a single frequency or a plurality of frequencies as previously described. In practice, a frequency of 600 cycles per second and 750 cycles per second have been utilized together. In addition, control 16A instantly disconnects the subscriber utilizing the desired trunk from normal switchboard 11A and applies busy signals to that subscriber's line. The switching pulses arriving at station B through trunk control 16B are applied to receiver 18B which disconnects the local subscriber from its associated normal switchboard 11B and also applies busy signals to this subscriber's line. To prevent the audio frequency from causing receiver 18B to operate, the latter is provided with a circuit which insures that the highly sensitive receive relays will not operate unless the switching frequencies are received together. Upon reception of the 600 and 750 cycles/s. switching pulse two relays, each actuated by one frequency, energizes trunk control 16B to establish through connection to preferred subscriber's phone 19B. A single switching frequency outside the audio range might also be employed in place of the plurality of frequencies within the audio range. Messages originating at station B are handled in a like manner as that from the other direction.

In case of switching frequency receiver or generator breakdown or trunk control switching difficulty, emergency indicator 20 is provided. Any fault present in the equipment will be immediately indicated by the indicator 20 which is mounted in near proximity to the switchboard operator or attendant. The respective switchboard operators at the trunk positions will manually switch both subscribers to emergency service. The trunk line will then no longer be available for subscriber use. For the privileged subscriber, the transition to emergency service does not affect the manner in which his equipment is used. When switched to emergency service he will call his far end counterpart by depressing a key after removing his handset from its cradle. When switching a faulty line, however, no audible signals will be sent to the line and ringing will be sent as normal trunk exchange ringing. The return to normal service will likewise be indicated on the control attachment and the equipment can be switched back to normal service by the switchboard operator.

Thus, this invention permits automatic seizure and signaling of any number of channels from either direction while providing a busy signal to common users on the line or lines being seized and maintaining the busy signals on switchboards. The system is adapted for operation on common battery or local battery switchboards and connection to the main frame without modification to the switchboards. Operation is possible through two terminal switchboards or through intermediate switchboards without undue complications. Upon termination of the call, the special service line will be switched back to subscriber line positions at both ends as soon as the preferred subscribers replace their head set which thereby initiates the emission of the switching frequency release pulses.

When required amplifiers can be inserted between the switchboard and the preferred subscriber's switching system to establish the necessary input level.

Having thus described the invention what is claimed is:

In a telephone system having multiple community switchboards interconnected with trunk lines, a preferred subscriber switching apparatus for connecting an originating preferred subscriber directly to a called preferred subscriber comprising at least two switching tone generators operating at different frequencies, means under control of the originating preferred subscriber for simultaneously applying said switching tone generators to said trunk lines and for disconnecting all other lines therefrom, switching means at the called community switchboard for disconnecting the normal service community switchboard upon reception of the applied tones and for seizing the called preferred subscriber line, said switching means including separate relay means adapted to be actuated upon reception of each switching frequency such that through connection is established directly between preferred subscribers upon reception of all switching frequencies together, means for applying busy signals to all disconnected lines.

References Cited in the file of this patent

UNITED STATES PATENTS

| | | |
|---|---|---|
| 2,314,518 | Sandalls | Mar. 23, 1943 |
| 2,332,290 | Baumfalk | Oct. 19, 1943 |
| 2,346,114 | Rhoads | Apr. 4, 1944 |
| 2,350,193 | Rhoads | May 30, 1946 |
| 2,805,287 | Brandstetter et al. | Sept. 3, 1957 |
| 2,807,670 | Brandstetter et al. | Sept. 24, 1957 |

FOREIGN PATENTS

| | | |
|---|---|---|
| 928,721 | Germany | June 10, 1955 |